(12) United States Patent
Feick et al.

(10) Patent No.: US 7,756,032 B2
(45) Date of Patent: Jul. 13, 2010

(54) METHOD AND APPARATUS FOR COMMUNICATING DATA WITHIN MEASUREMENT TRAFFIC

(75) Inventors: Wayne A. Feick, Redwood City, CA (US); Sean P. Finn, Belmont, CA (US); Mansour J. Karam, Mountain View, CA (US); Michael A. Lloyd, San Carlos, CA (US); Herbert S. Madan, Tiburon, CA (US); James G. McGuire, San Francisco, CA (US); Jose-Miguel Pulido, Palo Alto, CA (US); Omar C. Baldonado, Palo Alto, CA (US)

(73) Assignee: Avaya Inc., Basking Ridge, NJ (US)

( * ) Notice: Subject to any disclaimer, the term of this patent is extended or adjusted under 35 U.S.C. 154(b) by 1579 days.

(21) Appl. No.: 10/070,339

(22) PCT Filed: Oct. 17, 2001

(86) PCT No.: PCT/US01/32309

§ 371 (c)(1),
(2), (4) Date: Jan. 17, 2003

(87) PCT Pub. No.: WO02/33893

PCT Pub. Date: Apr. 25, 2002

(65) Prior Publication Data

US 2007/0115840 A1    May 24, 2007

Related U.S. Application Data

(63) Continuation-in-part of application No. PCT/US01/32312, filed on Oct. 17, 2001, and a continuation-in-part of application No. PCT/US01/31259, filed on Oct. 5, 2001, and a continuation-in-part of application No. PCT/US01/31420, filed on Oct. 4, 2001, and a continuation-in-part of application No. PCT/US01/31419, filed on Oct. 4, 2001, which is a continuation-in-part of application No. 09/960,623, filed on Sep. 20, 2001, and a continuation-in-part of application No. 09/923,924, filed on Aug. 6, 2001, and a continuation-in-part of application No. 09/903,423, filed on Jul. 10, 2001, and a continuation-in-part of application No. 09/903,441, filed on Jul. 10, 2001.

(60) Provisional application No. 60/275,206, filed on Mar. 12, 2001, provisional application No. 60/241,450, filed on Oct. 17, 2000.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| G06F 15/173 | (2006.01) |
| G06F 15/16 | (2006.01) |

(52) U.S. Cl. ............... 370/234; 370/235; 370/233; 370/232; 370/231; 370/253; 709/223; 709/224; 709/232

(58) Field of Classification Search ......... 709/223–224; 370/253, 231–235
See application file for complete search history.

(56) References Cited

U.S. PATENT DOCUMENTS

| | | | |
|---|---|---|---|
| 4,284,852 | A | 8/1981 | Szybicki et al. |
| 4,345,116 | A | 8/1982 | Ash et al. |
| 4,495,570 | A | 1/1985 | Kitajima et al. |
| 4,594,704 | A | 6/1986 | Ollivier |
| 4,669,113 | A | 5/1987 | Ash et al. |
| 4,704,724 | A | 11/1987 | Krishnan et al. |
| 4,726,017 | A | 2/1988 | Krum et al. |
| 4,748,658 | A | 5/1988 | Gopal et al. |
| 4,788,721 | A | 11/1988 | Krishnan et al. |
| 4,839,798 | A | 6/1989 | Eguchi et al. |
| 4,901,244 | A | 2/1990 | Szeto ............... 364/481 |
| 4,920,432 | A | 4/1990 | Eggers et al. |
| 4,931,941 | A | 6/1990 | Krishnan |
| 4,939,726 | A | 7/1990 | Flammer et al. |
| 4,949,187 | A | 8/1990 | Cohen |
| 4,949,248 | A | 8/1990 | Caro |
| 5,142,570 | A | 8/1992 | Chaudhary et al. |
| 5,172,413 | A | 12/1992 | Bradley et al. |

| | | |
|---|---|---|
| 5,253,341 A | 10/1993 | Rozmanith et al. |
| 5,271,000 A * | 12/1993 | Engbersen et al. .......... 370/244 |
| 5,287,537 A | 2/1994 | Newmark et al. |
| 5,291,554 A | 3/1994 | Morales |
| 5,341,477 A | 8/1994 | Pitkin et al. |
| 5,343,463 A | 8/1994 | van Tetering et al. ......... 370/13 |
| 5,371,532 A | 12/1994 | Gelman et al. |
| 5,375,070 A | 12/1994 | Hershey et al. |
| 5,406,502 A | 4/1995 | Haramaty et al. |
| 5,410,343 A | 4/1995 | Coddington et al. |
| 5,414,455 A | 5/1995 | Hooper et al. |
| 5,442,389 A | 8/1995 | Blahut et al. |
| 5,442,390 A | 8/1995 | Hooper et al. |
| 5,442,749 A | 8/1995 | Northcutt et al. |
| 5,452,294 A | 9/1995 | Natarajan |
| 5,467,345 A | 11/1995 | Cutler, Jr. et al. ............. 370/60 |
| 5,471,622 A | 11/1995 | Eadline |
| 5,471,623 A | 11/1995 | Napolitano, Jr. ....... 395/200.03 |
| 5,475,615 A | 12/1995 | Lin |
| 5,477,536 A | 12/1995 | Picard |
| 5,508,732 A | 4/1996 | Bottomley et al. |
| 5,515,511 A | 5/1996 | Nguyen et al. |
| 5,519,435 A | 5/1996 | Anderson |
| 5,521,591 A | 5/1996 | Arora et al. |
| 5,528,281 A | 6/1996 | Grady et al. |
| 5,535,195 A | 7/1996 | Lee |
| 5,537,394 A | 7/1996 | Abe et al. ...................... 370/17 |
| 5,563,875 A | 10/1996 | Hefel et al. |
| 5,574,938 A | 11/1996 | Bartow et al. ................ 395/800 |
| 5,590,126 A | 12/1996 | Mishra et al. ............... 370/329 |
| 5,629,930 A | 5/1997 | Beshai et al. |
| 5,631,897 A | 5/1997 | Pacheco et al. |
| 5,636,216 A | 6/1997 | Fox et al. |
| 5,652,841 A | 7/1997 | Nemirovsky et al. ........ 395/201 |
| 5,654,958 A | 8/1997 | Natarajan ................... 370/410 |
| 5,659,796 A | 8/1997 | Thorson et al. ......... 395/200.71 |
| 5,668,800 A | 9/1997 | Stevenson |
| 5,675,741 A | 10/1997 | Aggarwal et al. |
| 5,729,528 A | 3/1998 | Salingre et al. ............. 370/230 |
| 5,754,639 A | 5/1998 | Flockhart et al. |
| 5,787,253 A | 7/1998 | McCreery et al. ...... 395/200.61 |
| 5,793,976 A | 8/1998 | Chen et al. |
| 5,802,106 A | 9/1998 | Packer |
| 5,805,594 A | 9/1998 | Kotchey et al. |
| 5,812,528 A | 9/1998 | VanDervort .................. 370/235 |
| 5,835,710 A | 11/1998 | Nagami et al. |
| 5,841,775 A | 11/1998 | Huang ........................ 370/422 |
| 5,845,091 A | 12/1998 | Dunne et al. |
| 5,884,047 A | 3/1999 | Aikawa et al. ......... 395/200.68 |
| 5,892,754 A * | 4/1999 | Kompella et al. ........... 370/236 |
| 5,935,216 A | 8/1999 | Benner et al. ............... 709/248 |
| 5,940,478 A | 8/1999 | Vaudreuil et al. ........ 379/88.18 |
| 5,944,779 A | 8/1999 | Blum ......................... 709/201 |
| 5,974,457 A | 10/1999 | Waclawsky et al. |
| 6,006,264 A | 12/1999 | Colby et al. |
| 6,009,081 A | 12/1999 | Wheeler et al. |
| 6,012,088 A | 1/2000 | Li et al. ...................... 709/219 |
| 6,026,441 A | 2/2000 | Ronen |
| 6,034,946 A | 3/2000 | Roginsky et al. |
| 6,052,718 A | 4/2000 | Gifford ....................... 709/219 |
| 6,064,946 A | 5/2000 | Beerends ..................... 702/57 |
| 6,069,889 A | 5/2000 | Feldman et al. |
| 6,078,963 A | 6/2000 | Civanlar et al. ............. 709/238 |
| 6,108,703 A | 8/2000 | Leighton et al. |
| 6,111,881 A | 8/2000 | Soncodi |
| 6,119,235 A | 9/2000 | Vaid et al. |
| 6,130,890 A | 10/2000 | Leinwand et al. |
| 6,167,052 A | 12/2000 | McNeill et al. |
| 6,173,324 B1 | 1/2001 | D'Souza |
| 6,178,448 B1 | 1/2001 | Gray et al. .................. 709/224 |
| 6,185,598 B1 | 2/2001 | Farber et al. |
| 6,185,601 B1 | 2/2001 | Wolff ......................... 709/203 |
| 6,189,044 B1 | 2/2001 | Thomson et al. ............. 709/242 |
| 6,226,266 B1 | 5/2001 | Galand et al. |
| 6,275,470 B1 | 8/2001 | Ricciulli |
| 6,282,562 B1 | 8/2001 | Sidi et al. |
| 6,286,045 B1 | 9/2001 | Griffiths et al. |
| 6,292,832 B1 | 9/2001 | Shah et al. .................. 709/226 |
| 6,311,144 B1 | 10/2001 | Abu et al. ....................... 703/2 |
| 6,317,778 B1 | 11/2001 | Dias et al. ................... 709/214 |
| 6,339,595 B1 | 1/2002 | Rekhter et al. |
| 6,341,309 B1 | 1/2002 | Vaid et al. |
| 6,363,332 B1 | 3/2002 | Rangarajan et al. ......... 702/185 |
| 6,385,198 B1 * | 5/2002 | Ofek et al. .................. 370/389 |
| 6,385,643 B1 | 5/2002 | Jacobs et al. ................ 709/203 |
| 6,415,323 B1 | 7/2002 | McCanne et al. |
| 6,426,955 B1 | 7/2002 | Dalton, Jr. et al. .......... 370/401 |
| 6,434,606 B1 | 8/2002 | Borella et al. |
| 6,438,592 B1 | 8/2002 | Killian |
| 6,446,028 B1 | 9/2002 | Wang ......................... 702/186 |
| 6,452,950 B1 | 9/2002 | Ohlsson et al. |
| 6,453,356 B1 | 9/2002 | Sheard et al. ................ 709/231 |
| 6,463,454 B1 | 10/2002 | Lumelsky et al. |
| 6,493,353 B2 | 12/2002 | Kelly et al. .................. 370/467 |
| 6,522,627 B1 | 2/2003 | Mauger ....................... 370/230 |
| 6,526,056 B1 | 2/2003 | Rekhter et al. |
| 6,538,416 B1 | 3/2003 | Hahne et al. ................ 320/431 |
| 6,556,582 B1 | 4/2003 | Redi ........................... 370/443 |
| 6,560,204 B1 | 5/2003 | Rayes ......................... 370/253 |
| 6,594,307 B1 | 7/2003 | Beerends .................... 375/224 |
| 6,601,098 B1 | 7/2003 | Case et al. |
| 6,601,101 B1 | 7/2003 | Lee et al. .................... 709/227 |
| 6,608,841 B1 | 8/2003 | Koodli |
| 6,611,872 B1 | 8/2003 | McCanne |
| 6,614,789 B1 | 9/2003 | Yazdani et al. .............. 370/392 |
| 6,625,648 B1 | 9/2003 | Schwaller et al. |
| 6,631,419 B1 | 10/2003 | Green |
| 6,633,640 B1 | 10/2003 | Cohen et al. |
| 6,661,797 B1 | 12/2003 | Goel et al. |
| 6,687,229 B1 | 2/2004 | Kataria et al. ............... 370/238 |
| 6,704,768 B1 | 3/2004 | Zombek et al. ............. 709/201 |
| 6,707,824 B1 | 3/2004 | Achilles et al. ............. 370/412 |
| 6,711,137 B1 | 3/2004 | Klassen et al. |
| 6,711,152 B1 | 3/2004 | Kalmanek, Jr. et al. ..... 370/351 |
| 6,714,549 B1 | 3/2004 | Phaltankar |
| 6,714,896 B1 | 3/2004 | Barrett ....................... 702/189 |
| 6,728,484 B1 | 4/2004 | Ghani ........................... 398/42 |
| 6,728,779 B1 | 4/2004 | Griffin et al. ................ 709/239 |
| 6,735,177 B1 * | 5/2004 | Suzuki ........................ 370/238 |
| 6,748,426 B1 | 6/2004 | Shaffer et al. |
| 6,751,562 B1 | 6/2004 | Blackett et al. ............... 702/61 |
| 6,751,664 B1 * | 6/2004 | Kogan et al. ................ 709/224 |
| 6,757,255 B1 * | 6/2004 | Aoki et al. .................. 370/252 |
| 6,760,775 B1 | 7/2004 | Anerousis et al. ........... 709/238 |
| 6,760,777 B1 | 7/2004 | Agarwal et al. ............. 709/238 |
| 6,766,381 B1 | 7/2004 | Barker et al. |
| 6,795,399 B1 | 9/2004 | Benmohamed et al. |
| 6,795,860 B1 | 9/2004 | Shah ........................... 709/229 |
| 6,801,502 B1 | 10/2004 | Rexford et al. .............. 370/235 |
| 6,810,417 B2 | 10/2004 | Lee ............................ 709/220 |
| 6,819,662 B1 | 11/2004 | Grover et al. ............... 370/351 |
| 6,820,133 B1 | 11/2004 | Grove et al. ................. 709/238 |
| 6,826,613 B1 | 11/2004 | Wang et al. ................. 709/227 |
| 6,829,221 B1 | 12/2004 | Winckles et al. ............ 370/238 |
| 6,836,463 B2 | 12/2004 | Garcia-Luna-Aceves et al. ........................ 370/238 |
| 6,839,745 B1 | 1/2005 | Dingari et al. ............... 709/219 |
| 6,839,751 B1 | 1/2005 | Dietz et al. .................. 709/224 |
| 6,885,641 B1 | 4/2005 | Chan et al. |
| 6,909,700 B1 | 6/2005 | Benmohamed et al. |
| 6,912,222 B1 | 6/2005 | Wheeler et al. ........ 370/395.31 |
| 6,956,858 B2 | 10/2005 | Hariguchi et al. ...... 370/395.31 |
| 6,963,575 B1 | 11/2005 | Sistanizadeh et al. ....... 370/404 |
| 6,963,914 B1 * | 11/2005 | Breitbart et al. ............. 709/226 |

| | | | | |
|---|---|---|---|---|
| 6,973,490 B1 | 12/2005 | Robertson et al. ........... 709/224 |
| 6,981,055 B1 | 12/2005 | Ahuja et al. ................ 709/238 |
| 6,984,991 B2 | 1/2006 | Bond et al. .................. 370/325 |
| 6,993,584 B2 | 1/2006 | Border et al. ............... 709/227 |
| 6,999,432 B2 | 2/2006 | Zhang et al. ................ 370/328 |
| 7,002,917 B1 | 2/2006 | Saleh |
| 7,020,086 B2 | 3/2006 | Juttner et al. ............... 370/238 |
| 7,024,475 B1 | 4/2006 | Abaye et al. ................ 709/224 |
| 7,043,541 B1 | 5/2006 | Bechtolsheim et al. ...... 709/223 |
| 7,043,562 B2 | 5/2006 | Dally et al. ................. 709/238 |
| 7,065,584 B1 | 6/2006 | Shavitt et al. |
| 7,085,230 B2 | 8/2006 | Hardy ........................ 370/232 |
| 7,099,282 B1 | 8/2006 | Hardy ........................ 370/252 |
| 7,110,393 B1 | 9/2006 | Tripathi et al. .............. 370/352 |
| 7,111,073 B1 | 9/2006 | Jain et al. ................... 709/241 |
| 7,123,620 B1 | 10/2006 | Ma ........................ 370/395.32 |
| 7,139,242 B2 | 11/2006 | Bays .......................... 370/238 |
| 7,155,436 B2 | 12/2006 | Hegde et al. .................. 707/10 |
| 7,162,539 B2 | 1/2007 | Garcie-Luna-Aceves .... 709/242 |
| 7,269,157 B2 | 9/2007 | Klinker et al. .............. 370/351 |
| 2001/0010059 A1 | 7/2001 | Burman et al. .............. 709/224 |
| 2001/0026537 A1 | 10/2001 | Massey ...................... 370/316 |
| 2001/0037311 A1 | 11/2001 | McCoy et al. |
| 2002/0038331 A1 | 3/2002 | Flavin |
| 2002/0087687 A1 | 7/2002 | Zaifman et al. ............. 709/225 |
| 2002/0101821 A1 | 8/2002 | Feldmann et al. ........... 370/232 |
| 2002/0124100 A1 | 9/2002 | Adams |
| 2002/0152318 A1 | 10/2002 | Menon et al. ............... 709/231 |
| 2002/0184527 A1 | 12/2002 | Chun et al. ................. 713/201 |
| 2003/0016770 A1 | 1/2003 | Trans et al. |
| 2003/0039212 A1 | 2/2003 | Lloyd et al. ................. 370/235 |
| 2003/0112788 A1 | 6/2003 | Erhart et al. ................ 370/345 |
| 2004/0030776 A1 | 2/2004 | Cantrell et al. .............. 709/224 |
| 2004/0062267 A1 | 4/2004 | Minami et al. .............. 370/463 |
| 2004/0218546 A1 | 11/2004 | Clark ......................... 370/252 |
| 2005/0044270 A1 | 2/2005 | Groove et al. ............... 709/238 |
| 2005/0083912 A1 | 4/2005 | Asfar et al. ................. 370/352 |
| 2005/0132060 A1 | 6/2005 | Mo et al. .................... 709/227 |
| 2005/0185654 A1 | 8/2005 | Zadikian et al. ........ 370/395.21 |
| 2005/0201302 A1 | 9/2005 | Gaddis et al. ............... 370/254 |
| 2005/0243726 A1 | 11/2005 | Narendran .................. 370/238 |
| 2006/0026682 A1 | 2/2006 | Zakas ......................... 726/22 |
| 2006/0036763 A1 | 2/2006 | Johnson et al. ............. 709/238 |
| 2007/0271066 A1 | 11/2007 | Nikitin et al. ............... 702/181 |
| 2008/0101793 A1 | 5/2008 | Koch et al. .................... 398/1 |

FOREIGN PATENT DOCUMENTS

| | | |
|---|---|---|
| EP | 0 504 537 | 3/1991 |
| EP | 0 528 075 A1 | 2/1993 |
| EP | 0 788 267 A2 | 8/1997 |
| EP | 0 598 969 B1 | 2/1999 |
| EP | 0 942 560 A2 | 9/1999 |
| EP | 0 977 456 A2 | 2/2000 |
| EP | 0 982 901 A1 | 3/2000 |
| EP | 0 999 674 B1 | 4/2004 |
| WO | WO 94/08415 | 4/1994 |
| WO | WO 99/06913 | 2/1999 |
| WO | WO 99/14907 | 3/1999 |
| WO | WO 99/14931 | 3/1999 |
| WO | WO 99/14932 | 3/1999 |
| WO | WO 99/18751 | 4/1999 |
| WO | WO 99/30460 | 6/1999 |
| WO | WO 99/39481 | 8/1999 |
| WO | WO 00/04458 | 1/2000 |
| WO | WO 00/25224 | 5/2000 |
| WO | WO 00/38381 | 6/2000 |
| WO | WO 00/45560 | 8/2000 |
| WO | WO 00/52906 | 9/2000 |
| WO | WO 00/62489 | 10/2000 |
| WO | WO 00/72528 A1 | 11/2000 |
| WO | WO 00/79362 A2 | 12/2000 |
| WO | WO 00/79730 A2 | 12/2000 |
| WO | WO 01/06717 A1 | 1/2001 |
| WO | WO 01/13585 A1 | 2/2001 |
| WO | WO 02/33896 A3 | 4/2002 |

OTHER PUBLICATIONS

Nick Feamster et al., "Controlling the Impact of BGP Policy Changes on IP Traffic", Nov. 6, 2001, pp. 1-18.
Dean Jones, "Developing Shared Ontologies in Multi-Agent Systems", pp. 1-10.
L. Massoulié et al., "Arguments in favour of admission control for TCP flows", pp. 1-16.
"A Longest Prefix Match Search Engine for Multi-Gigabit IP Processing", Masayoshi Kobayashi et al., C&C Media Research Laboratories, NEC Corporation, pp. 1360-1364, 2000 IEEE.
"Internet Protocol" from Nortel Networks, www.arvelo.net/net-bay-ip.html. Apr. 6, 2005, 26 pages.
Yasushi Saito et al., "Manageability, Availability and Performance in Porcupine: A Highly Scalable, Cluster-Based Mail Service", 17th ACM Symposium on Operating System Principles, pp. 1-15, Dec. 1999.
Nikolaos Skarmeas et al., "Content Based Routing as the Basis for Intra-Agent Communication", Department of Computing Imperial College London.
Nikolaos Skarmeas et al., "Intelligent Routing Based on Active Patterns as the Basis for the Integration of Distributed Information Systems", Department of Computing Imperial College London, Feb. 1997.
Z. Wang et al., "Resource Allocation for Elastic Traffic: Architecture and Mechanisms," pp. 158-169.
J. Yu, "Scalable Routing Design Principles," The Internet Society, Jul. 2000, pp. 1-26.
Paul Francis et al., "An Architecture for a Global Internet Host Distance Estimation Service," pp. 1-17.
T. Bates et al., "Multiprotocol Extensions for BGP-4", The Internet Society, Jun. 2000, pp. 1-10.
S. Kumar et al., "The MASC/BGMP Architecture for Inter-domain Multicast Routing," 12 pages.
S. Berson et al., "An Architecture for Advance Reservations in the Internet," USC Information Sciences Institute, Jul. 16, 1998, pp. 1-21.
R. P. Draves et al., "Constructing Optimal IP Routing Tables," 1999 IEEE, 1-10.
R. Govindan et al., "An Analysis of Internet Inter-Domain Topology and Route Stability," USC Information Sciences Institute, 1997 IEEE, 8 pages.
V. Paxson, "Toward a Framework for Defining Internet Performance Metrics," http://www.isoc.org/inet96/proceedings/d3/d3_3.htm, pp. 1-20.
C. Alaettinoglu et al. "Routing Policy Specification Language (RPSL)," http://quimby.gnus.org/internet-drafts/draft-ietf-rps-rpsl-v2-00.txt, pp. 1-56.
P. Traina, "BGP-4 Protocol Analysis," Mar. 1995, pp. 1-10.
B. Krishnamurthy et al., "On Network-Aware Clustering of Web Clients," 14 pages.
Sami Iren et al., "The Transport Layer: Tutorial and Survey", ACM Computing Surveys, vol. 31, No. 4, Dec. 1999, pp. 361-405.
D. B. Ingham et al., "Supporting Highly Manageable Web Services", Computer Networks and ISDN Systems 29 (1997), pp. 1405-1416.
Murthy, Shree, et al, "A loop-free routing protocol for large-scale internets using distance vectors,"Mar. 14, 2007, pp. 147-161, Computer Communications.
Francis, Paul, et al, "An Architecture for a Global Internet Host Distance Estimation Service," 1999, pp. 210-217, IEEE.
Bouloutas, A. et al, "Some Graph Partitioning Problems and Algorithms Related to Routing in Large Computer Networks," International Conference on Distributed Computing Systems, Newport Beach, Jun. 5-9, 1989, pp. 362-370, Washington, IEEE Comp. Soc. Press, US.
Yositsugu Ohmae et al, "Dividing Method for Topological Design of Corporate Communication Networks," Aug. 1, 1992, pp. 54-62, Communications, Wiley Hoboken ,NJ, US.

D. New, "RFC 3620, The Tunnel Profile," Oct. 2003, The Internet Society.

\* cited by examiner

*Primary Examiner*—Philip J Chea
(74) *Attorney, Agent, or Firm*—Sheridan Ross P.C.

(57) ABSTRACT

The present invention is directed to using measurement packets to compute network performance. Embodiments that send, receive and both send and receive measurement packets are described. Some embodiments are described that compute statistics based at least partly on measurement traffic. Some embodiments are described that communicate computed statistics within measurement traffic. Some embodiments are described that rank and select paths based at least partly on computed statistics.

52 Claims, 3 Drawing Sheets

METHOD AND APPARATUS FOR COMMUNICATING DATA WITHIN MEASUREMENT TRAFFIC

CROSS REFERENCE TO RELATED APPLICATIONS

This application is (a) the National Stage of PCT Application No. PCT/US01/32309, filed Oct. 17, 2001; and (b) is a continuation-in-part of PCT Application No. PCT/US01/32312, filed Oct. 17, 2001; (c) PCT Application No. PCT/US01/31259, filed Oct. 5, 2001; (d) PCT Application No. PCT/US01/31420, filed Oct. 4, 2001; and (e) PCT Application No. PCT/US01/31419, filed Oct. 4, 2001; which (a), (b), (c), (d) and (e) are continuations-in-part of (i) U.S. application Ser. No. 09/960,623, filed Sep. 20, 2001; (ii) U.S. application Ser. No. 09/903,423, filed Jul. 10, 2001; (iii) U.S. application Ser. No. 09/923,924, filed Aug. 6, 2001; and (iv) U.S. application Ser. No. 09/903,441, filed Jul. 10, 2001; which (i), (ii), (iii) and (iv) claim the benefit of (1) U.S. Provisional Application No. 60/275,206, filed Mar. 12, 2001; and (2) U.S. Provisional Application No. 60/241,450, filed Oct. 17, 2000. These applications are hereby incorporated by reference.

BACKGROUND OF THE INVENTION

1. Field of the Invention

This invention relates to the field of networking. In particular, the invention relates to communicating data within measurement traffic.

2. Description of the Related Art

Internetworks such as the Internet provide a best-effort service and do not reserve resources for a path. Hence, performance characteristics of the path such as delay, jitter and loss can change over time due to routing changes, congestion, and lack of connectivity, and therefore it is important to being able to measure them. There are several tools available to measure the performance characteristics of a path:

Ping uses ICMP packets to measure reachability and round trip delay from a source host to a remote host.

Traceroute detects common reachability problems such as routing loops and network black holes by sending ICMP packets from a source host to a destination host, and by receiving ICMP responses from intermediate routers along the path between the source host and the remote host. Each intermediate router in the path decrements the TTL value stored in the header of an ICMP packet by one; when the TTL field expires (reaches the value zero) in a router, the router does not forward the packet towards the destination host. Instead, it returns the ICMP to the source host responding with a Time Exceeded response. By starting with an initial TTL value of 1 and gradually incrementing the TTL field in successive ICMP packets, the source host is able to receive an ICMP response from all the routers in the path. Traceroute also computes the round trip time of each ICMP packet, hence being able to determine the round trip delay between the source host and intermediate routers.

Pathchar measures congestion of a path by estimating performance characteristics of each node along a path from a source to a destination. Pathchar also leverages the ICMP protocol's Time Exceeded response to packets whose TTL has expired. By sending a series of UDP packets of various sizes to each hop, pathchar uses knowledge about earlier nodes and the round trip time distribution to this node to assess incremental bandwidth, latency, loss, and queue characteristics across the link connected to this node.

These tools are mainly used for troubleshooting purposes. A more formal attempt to measure performance characteristics of Internet paths is being developed by the IP Performance Metrics (IPPM) working group of the Internet Engineering Task Force (IETF). The IPPM working group has specified a general framework for measuring performance characteristics of a path, including specifications for clock synchronization and for size, number and inter-transmission time of measurement packets. The IPPM working group has also specified specific performance metrics for one-way delay, one-way inter-packet delay variation, and one-way loss, among others. The goal of the IPPM measurement framework is to allow service providers and other network providers to develop and operate and inter-operable measurement infrastructure, for performance and billing purposes, among other purposes.

However, even if this measurement infrastructure is in place, a way to communicate measurements and performance characteristics of measured paths to appropriate points of the network where decisions based on those performance characteristics can be made, is needed. In addition, this communication should be efficient, i.e., it should minimize the amount of bandwidth consumed.

SUMMARY OF THE INVENTION

The invention includes methods and apparatuses for communicating data within measurement traffic. Some embodiments of the invention will consist of a sender of measurement packets. Some embodiments of the invention will consist of a receiver of measurement packets. Some embodiments of the invention will consist of both a sender and a receiver of measurement packets.

In some embodiments of the invention, measurement packets will traverse one or more paths traversing at least a portion of an internetwork.

In some embodiments of the invention, the measurement packet will include information for a receiver of the measurement packet to compute measurements of performance characteristics of at least a portion of the path of the measurement packet. In some embodiments, the measurement packet sizes and times between measurement packets will simulate the traffic pattern of one or more applications such as—by way of a non-limiting example—voice and video.

In an embodiment that includes a receiver of measurement packets, measurement statistics may be computed that are at least partly recomputed with the arrival of each measurement packet. This computation may include at least one of a moving average, an average based on the Robbins-Moro estimator, a window-based average, and a bucket-based average.

In some embodiments of the invention, the measurement packets will contain data including one or more of measurement statistics, a generic communication channel, network information, and control data directing a receiver of the measurement packet to change one or more configuration parameters of the receiver.

In an embodiment wherein the data includes measurement statistics, the measurement statistics may include one or more of delay, jitter and loss.

Some embodiments of the invention will contain clocks synchronized by GPS, IRIG, NTP or NIST. Some other embodiments will use unsynchronized clocks and will adjust for clock skew and drift by performing computations on the measurement data.

In some embodiments of the invention, paths will be selected based at least in part on at least one of: one or more of the measurement statistics from the measurement packet and one or more of the computed statistics.

These and other embodiments are described further herein.

DETAILED DESCRIPTION

Measurement Packets

Figure 1:
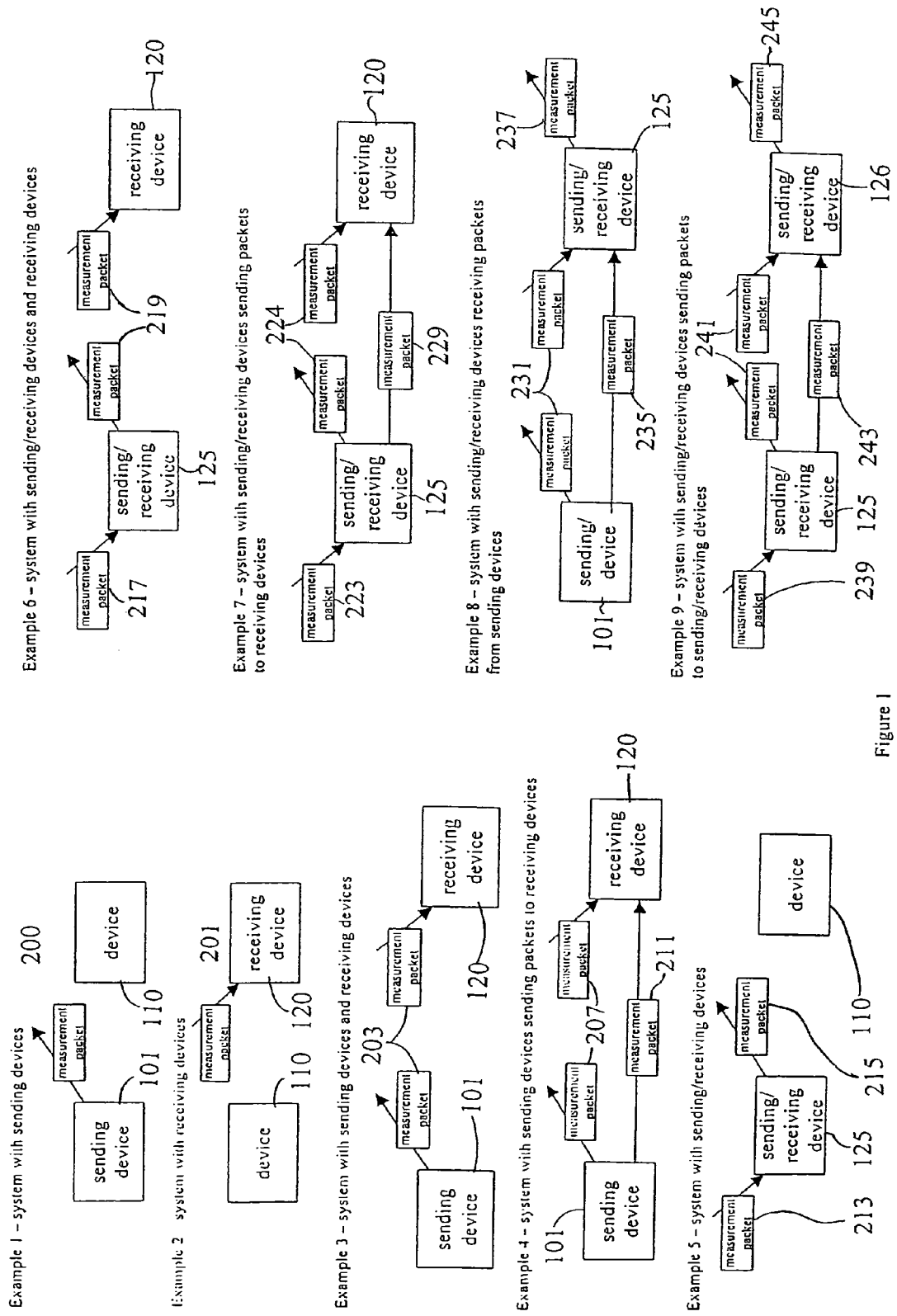
FIG. 1 shows some possible embodiments of devices that are communicating with each other, for example sending and receiving measurement packets.

A measurement packet is a packet sent by a sender over an internetwork that includes information necessary for the receiver of the packet to compute measurements of the performance characteristics of the path the packet has traversed over that internetwork. The information includes information for a receiver of the measurement packet to compute measurements of performance characteristics of at least a portion of the path of the measurement packet; and data including one or more of measurement statistics, a generic communication channel, network information, and control data directing a receiver of the measurement packet to change one or more configuration parameters of the receiver.

In some embodiments of the invention, the information included in the measurement packet to compute measurements includes at least one of a timestamp of a sending time of the packet and a number to identify the packet by itself and/to identify the relative position of the measurement packet in a sequence of measurement packets, In some embodiments of the invention, the measurement packet is implemented using the following data structure:

```
struct MeasurementHeader {
    /**
     * A generation number. This value represents when the
     * sender began sending. This value is a standard Unix
     * timestamp that seconds since Jan 1, 1970 UTC.
     **/
    uint32_t mGeneration;
    /**
     * A sequence number for the packet. This increments each
     * time a packet is sent and rolls over when 16 bits is
     * exceeded.
     **/
    uint16_t mSequence;
    /**
     * The IP address the packet is sent to.
     **/
    uint32_t mDstAddr;
    /**
     * The send timestamp for this packet.
     **/
    uint64_t mSendTime;
};
```

The mGeneration field is used to detect when a sending process has started a new session. This field is used by the receiver to determine that a discontinuity in the stream's sequence numbers is the result of a sender restart, rather than due to large network latencies, duplicate packets or dropped packets.

The sequence number msequence field is incremented by one each time a packet is sent. This approach allows the receiver to deduce lost and duplicate packets by identifying missing and duplicate sequence numbers.

The mSendTime field contains the time at which the packet was sent, represented as microseconds since Jan. 1, 1970 UTC. This field is compared to the time the packet arrived at the receiver to determine the delay between the sender and the receiver.

In some embodiments of the invention, a plurality of one or more packets are sent over a path continuously. In some embodiments of the invention, the continuous stream of packet is denoted as a measurement stream. Each measurement stream is uniquely identified by the source and destination IP addresses. The sender maintains one socket descriptor for each source IP address it sends from and writes the destination IP address into the mDstAddr field. On the receiver side, the source IP address is returned by the recv( ) system call and the destination address is retrieved from the measurement packet.

Data Included in the Measurement Packets

In measurement packets that contain sufficient space, data will be included, including one or more of measurement statistics, a generic communication channel, network information, and control data directing a receiver of the measurement packet to change one or more configuration parameters of the receiver.

Some embodiments of the invention will add a single type of data to each packet. Some embodiments of the invention will use a complex data, including subpackets.

Some embodiments of the invention use subpackets that include a single byte subpacket type identifier, followed by a 2-byte length field (including the length of the type and length fields) and finally including the data that is to be sent. One embodiment will store all values in network byte order. Other byte orders will be apparent to those skilled in the art. The following data structure definition describes some embodiments.

```
class SubPacket {
    /*
     * The type identifier for this subpacket.
     */
    uint8_t mType;
    /*
     * The length of this subpacket, in network byte order.
     */
    uint16_t mLength;
};
```

One embodiment of this invention will include data describing a momentary snapshot of the measurement statistics for a given path between a sender and a receiver.

In some embodiments of this invention, this data will include one or more of the following information: the source and destination IP addresses that define the path, a measurement packet size for which the statistics have been calculated as well as computed measurement statistics that are at least partly responsive to delay; computed measurement statistics that are at least partly responsive to jitter and computed measurement statistics that are at least partly responsive to packet loss.

In one embodiment of this invention, these statistics will be in units of microseconds expressed as 64-bit floating-point quantities and transmitted in a standard network byte order.

In one embodiment of this invention, the following data structure will store the computed statistics:

```
class TunnelStatsSubPacket : public SubPacket {
    /**
     * The time that this statistic snapshot was taken (in
     * microseconds since 1970).
     **/
    uint64_t mTimestamp;
    /**
     * The source IP address of the tunnel these statistics
apply
     * to.
     **/
    uint32_t mSrcAddr;
    /**
     * The destination IP address of the tunnel these
statistics
     * apply to.
     **/
    uint32_t mDstAddr;
    /**
     * The size of measurement packet that these statistics
apply
     * to. A size of 0 indicates that these statistics
apply to
     * all packet sizes.
     **/
    uint16_t mPktSize;
    /**
     * The average delay in microseconds.
     **/
    double mDelay;
    /**
     * The average jitter in microseconds.
     **/
    double mJitter;
    /**
     * The percentage of packets that have been lost, in the
range
     * 0 to 1.
     **/
    double mLoss;
};
```

Some embodiments of this invention include the time at which the statistics were computed such that those statistics are sent over multiple paths for improved reliability and to take advantage of one path having less delay than another. One embodiment at the receiving end is able to compare the computation times of received statistics to place them in their original temporal order, regardless of their relative arrival times over the paths.

Some embodiments of this invention will send computed statistics specific to the paths that are part of the plurality of one or more paths that are between the specific sender and receiver. Other embodiments will send additional computed statistics for paths that are not one of the plurality of one or more paths that are between the specific sender and receiver.

Some embodiments of this invention will include network information concerning network topology including but not limited to information retrieved from routers such as in-bound or out-bound link utilization, inbound or out-bound link bandwidth and/or CPU utilization. Other network information determined from routers and other network devices will be apparent to someone skilled in the art.

Some embodiments of this invention will also include control data directing a receiver of the measurement packet to change one or more configuration parameters of the receiver.

In some embodiments of the invention, the control data will instruct a receiver to alter its configuration, including but not limited to zero or more of the following examples: instructing a receiver to initiate sending a plurality of one or more measurement packets, change one or more of the measurement packet sizes, inter-measurement packet transmission times and mix of packet sizes, and stop sending one or more of the plurality of measurement packets.

In some embodiments of the invention, this control information will include notification of measurement devices that have joined or left the network.

In many embodiments of the invention, the measurement packets will be encrypted by the sender and decrypted by the receiver. Some of these embodiments will use IPSec.

In some embodiments of the invention, the encryption and decryption will be done by an external device using IPSec.

Other encryption and decryption options will be apparent to one skilled in the art.

In some embodiments of the invention, the measurement packets will be digitally signed.

In some embodiments of the invention, a generic communication channel will be used by a sender and a receiver to communicate data between them.

Performance Characteristics of a Path

Measurements are used to compute performance characteristics of the paths traversed by the measurement packets. The measurements can either be computed from the measurement packets themselves, or extracted from the arbitrary data carried by the measurement packets. The measurements of performance characteristics include at least one or more of one-way measurements and round-trip measurements. The performance characteristics include at least one or more reachability, delay, jitter, loss, available bandwidth, and total bandwidth. Other performance characteristics will be apparent to those skilled in the art.

In some embodiments of the invention, delay measurements are computed as the interval of time from the moment the measurement packet is sent by the sender to the moment of time the measurement packet is received by the receiver. The sending time is carried by the packet, and it is measured by the clock the sender refers to. The receiving time is measured by a clock that the receiver refers to, which may or may not be synchronized with the sender's clock.

In some embodiments of the invention, the clock of the sender and the clock of the receiver are synchronized. A plurality of one or more precise clock inputs such as GPS, NTP, IRIG and NIST will be used. Some embodiments of this invention will use the same clock as an input to more than one of the plurality of one or more senders and receivers. In some embodiments of the invention, the clock of the sender and the clock of the receiver are the same.

In some embodiments of the inventions the clock of the sender and the clock of the receiver are not synchronized, and mechanisms based on the measurement data are used to correct the clock skew and clock drift, the mechanisms including using minimum delay across multiple measurement samples, and using a mechanism to track the minimum delay over time.

Some embodiments of the invention will use the minimum round-trip delay between the devices to place a lower bound on clock skew.

Some embodiments of the invention will use the lower bound of multiple paths between the sender and receiver to further reduce the lower bound.

Some embodiments of the invention will correct for clock drift by tracking the relative clock skew between the sender and receiver over time and adjusting for the slope of the drift.

In some embodiments of the invention, jitter measurements, also known as inter-measurement packet delay variations, are computed as the difference in delay on consecutive, successfully received packets.

In some embodiments of the invention, jitter can also be computed as the difference between the instantaneous delay of a packet, and the average delay of all the measurement packets previously received.

In some embodiments of the invention, loss measurements are computed by assigning a timeout value to each measurement packet that indicates the instant of time after which the measurement packet will be declared lost, if the packet has not arrived by that time. In some embodiments of the invention, the timeout value of a measurement packet can be computed with the transmission time of a previously received packet, an estimation of the inter-transmission time between measurement packet, and an estimation of the transmission delay of the measurement packet. In some embodiments of the invention, the inter-transmission time can be estimated if the receiver knows about the scheduling pattern of transmission of measurement packets. In some embodiments of the invention, the transmission delay of packet can be estimated based on delay and jitter performance characteristics.

Performance characteristics of a path could be the measurement themselves, or statistics on those measurements. In the statistics case, a dynamic algorithm is used to updates the statistics associated with a path with every new measurement obtained with the arrival of every new packet over the path.

In some embodiments of the invention, the algorithm computes statistics over the performance characteristics of the path.

In some embodiments of the invention, the statistics include averages, deviations, and variances. Other statistics will be apparent to those skilled in the art. In some embodiments of the invention, averages can be computed using a plurality of one or more techniques including a moving average, an average based on the Robbins-Moro estimator, a window-based average or a bucket-based average. Other techniques to compute averages will be apparent to those skilled in the art.

In some embodiments of the invention, the moving average is an exponentially moving average computed using a Robbins-Moro estimator. The Robbins-Moro stochastic approximation estimator finds a solution of the equation:

$$E[f(t)-x]=0$$

where E is the expectation, f(t) a function and x the estimator. The general form of the solution is:

$$x(t)=x(t-1)+alpha*[f(t)-x(t-1)]=(1-alpha)*x(t-1)+alpha*f(t)$$

or, with $alpha=(1-\mu)$, $$x=\mu*x+(1-\mu)*f$$

$\mu$ is the weight of the estimator, and determines the amount contributed to the average by the function. In some embodiments of the invention, $\mu$ is constant.

In some embodiments of the invention, $\mu$ is a dynamic value, whose value depends on the last value of the function f according to the formula:

$$\mu=e\char`\^(-f/K)$$

where K is a constant that also determines the importance of the last value of $f$ with respect to the current value of the estimator x.

In some embodiments of the invention, average delay can be computed using an exponentially moving average as follows, $$d=\mu*d+(1-\mu)*m$$

where d is the exponentially moving average of delay, m is the last delay sample, and $\mu$ is the weight of the moving average.

In some embodiments of the invention, average jitter can be computed using an exponentially moving average as follows, $$v=\mu*v+(1-\mu)*|d-m|$$

where v is the exponentially moving average of jitter, |d−m| is the last sample of jitter, and $\mu$ is the weight of the average.

In some embodiments of the invention, average jitter can be computed using an exponentially moving average as follows, $$v=\mu*v+(1-\mu)*|m-m'|$$

Where v is the exponentially moving average of jitter, |m−m'| is the last sample of jitter, m is the last delay sample, m' is the previous delay sample, and $\mu$ is the weight of the average.

In some embodiments of the invention, delay and jitter averages can be combined into a single value as follows:

$$l=d+M*v$$

Where d is the average delay, v is the average jitter and M is a constant.

In some embodiments of the invention, average loss can be computed using an exponentially moving average as follows, $$p\text{-hat}=\mu*p\text{-hat}+(1-\mu)*p$$

where p-hat is the moving average of the loss, p={0 if packet is received, 1 is the packet is declared lost}, and $\mu$ is the weight of the exponentially moving average.

In some embodiments of the invention, $\mu$ is determined based on the notion of forgiveness against a single packet loss. The forgiveness period is the interval of time between the time the packet loss occurs and the time the average loss is forgiven. The forgiveness period can be either defined in units of time, or in number of packets if the rate of the monitoring flow is known. That is, the forgiveness period will end after n consecutive packets have been received after the loss, when these packets have been transmitted at a certain rate.

The value of the exponentially moving average after receiving the n packets is needed before $\mu$ can be determined, and this value is known as the forgiveness threshold. In some embodiments of the invention, the forgiveness threshold is chosen arbitrarily. In some embodiments of the invention, the forgiveness threshold takes the value:

$$\tfrac{1}{2}(1-\mu)$$

This value is half of the value of the estimator after the singe loss occurs, and thus we call it the half-life threshold. Similarly, we also call the forgiveness period under this threshold the half-life period. The advantage of using a forgiveness threshold greater than zero is that issues related to host-dependent floating-point representations reaching that value are avoided.

In some embodiments of the invention, $\mu$ is computed by comparing the value of the estimator after n consecutive packet arrivals since the loss with the half-life threshold:

$$p\text{-hat}=(1-\mu)*\mu\char`\^n<\tfrac{1}{2}(1-\mu)$$

Given that n is known because is determined by the value of the half-life period and the transmission rate, $\mu$ is computed as:

$$\mu = \exp((\ln \tfrac{1}{2})/n)$$

In some embodiments of the invention, two thresholds are defined, an upper threshold and a lower threshold. When the value of p-hat exceeds the upper threshold, the loss is not forgiven until enough measurement packets are received consecutively so that the value of p-hat gets below the lower threshold.

Other mechanisms to compute $\mu$ will be apparent to for those skilled in the art.

Path Description

In some embodiments of the invention, the path traversed by the measurement packets from the sender to the receiver is such that the path is at least partly implemented with at least one of a GRE tunnel, an IPSEC tunnel and IPonIP tunnel. Other path implementations using tunnel will be apparent for those skilled in the art.

In some embodiments of the invention, the path traversed by the measurement packets from the sender to the receiver is implemented with a virtual circuit, including a frame relay PVC, an ATM PVC or MPLS. Other path implementations using virtual circuits will be apparent for those skilled in the art.

Other path implementations will be apparent to those skilled in the art.

Internetwork Description

In some embodiments of the invention, the internetwork is implemented by a plurality of one or more subnetworks, including a plurality of one or more VPNs, a plurality of one or more BGP autonomous systems, a plurality of one or more local area networks, a plurality of one or metropolitan area networks, and a plurality of one or more wide area networks.

In some embodiments of the invention, the internetwork is implemented by an overlay network.

Other internetwork implementations will be apparent to those skilled in the art.

Packet Sizes and Transmission Times

In some embodiments of the invention, the measurement packets are of varying sizes, including 64, 256, 512, 1024, 1500 bytes.

In some embodiments of the invention, the size of the measurement packets is specified with an external API.

In some embodiments of the invention, the measurement packets are of a fixed size.

In some embodiments of the invention, the measurement packet sizes and times between measurement packets simulate the traffic pattern of a plurality of one or more applications In some embodiments of the invention, traffic patterns correspond to voice applications, where the packets re of small size, e.g., 30 bytes, and the inter-transmission time between consecutive packets is constant, e.g., 10 ms. These examples do not limit the possible size values and inter-transmission time values.

In some embodiments of the invention, traffic patterns correspond to video applications, where the packets size is the largest permitted to be transmitted by an internetwork without being fragmented, and the inter-transmission time between consecutive packets varies depending on the spatial and temporal complexity of the video content being transmitted, the compression scheme, the encoding control scheme.

In some embodiments of the invention, traffic patterns correspond to the plurality of applications observed in an internetwork, including at least one or more of HTTP transactions, FTP downloads, IRC communications, NNTP exchanges, streaming video sessions, VoIP sessions, video-conferencing sessions and e-commerce transactions. Other types of applications will be apparent to those skilled in the art.

In some embodiments of the invention, the inter-measurement packet transmission times are of varying length.

In some embodiments of the invention, the inter-measurement packet transmission times are of fixed length.

In some embodiments of the invention, the inter-measurement packet transmission times specified with an external API.

In some embodiments of the invention, the length of the inter-measurement packet transmission times is randomized according to a distribution. In some embodiments of the invention, this distribution is based at least in part on a uniform distribution. In some embodiments of the invention, this distribution is based at least in part on an exponential distribution. In some embodiments of the invention, this distribution is based at least in part on a geometric distribution. Other distributions will be apparent to those skilled in the art.

In some embodiments of the invention, the length of the inter-measurement packet transmission times is provided by a table.

In some embodiments of the invention, the length of the inter-measurement packet transmission times is controlled by a scheduler. In some embodiments of the invention, the scheduler uses a priority queue, keyed on desired send time.

Other mechanisms to specify the inter-measurement packet transmission time will be apparent to those skilled in the art.

Other packet sizes and transmission times will be apparent to those skilled in the art.

Path Selection

It is possible that multiple alternative paths between a sender and a receiver are available through an internetwork at any given moment. Performance characteristics of each of these paths can be used to select a subset of the paths.

In some embodiments of the invention, the subset of the plurality of paths is selected based at least in part on at least one of: one or more of the measurement statistics from the measurement packet and one or more of the computed statistics.

In some embodiments of the invention, the selection of the subset of the plurality of paths is based at least partly on the position of paths in a ranking. In some embodiments of the invention, the ranking is at least partly based on one or more of the measurement statistics included as data in the measurement packet. In some embodiments of the invention the ranking is at least partly based on the computed statistics of the path. In some embodiments of the invention the ranking is implemented by using a comparison function to compare the paths, and by ordering the paths in a decreasing order. In some embodiments of the invention the ranking is implemented by using a comparison function to compare the paths, and by ordering the paths in an increasing order. Other ranking techniques will be apparent to those skilled in the art.

In some embodiments of the invention, the ranking is based on a single score associated to each path. In some embodiments of the invention, this score is denoted magic Score (MS), and it is computed as follows:

$$MS = ML * MF$$

$$ML = d + M * v$$

$$MF = \text{delta} * \text{p-hat} + 1$$

where ML is the Magic Latency, a component of the MS obtained using delay and jitter respectively calculated with statistics; and MF is the Magic scaling Factor that multiplies the value of ML, and is computed based on loss statistics. M is a constant that takes several values, including 4, for example. MS can be seen as a scaled-up version of ML, and the scaling factor MF is a function of p-hat and delta, a constant. As p-hat not only reflects loss but also detects large delay spikes before they happen, p-hat can be seen as an indicator of the departure of the path from a "normal mode" operation, and thus the scaling factor is only applied when there are loss or spikes. The goal of MF is to differentiate between paths that have very similar delay characteristics, but with one having losses and the other not having them.

In some embodiments of the invention, ML is used as a delay indicator, given that jitter is accounted as an increase in delay. In contrast, MS, although a scaled version of ML, cannot be used to indicate delay, except when MF=1 (p-hat=0), which leads to MS=ML. That means the value of MS is useful not by itself but to compare it with the MSs of other tunnels.

Figure 2:
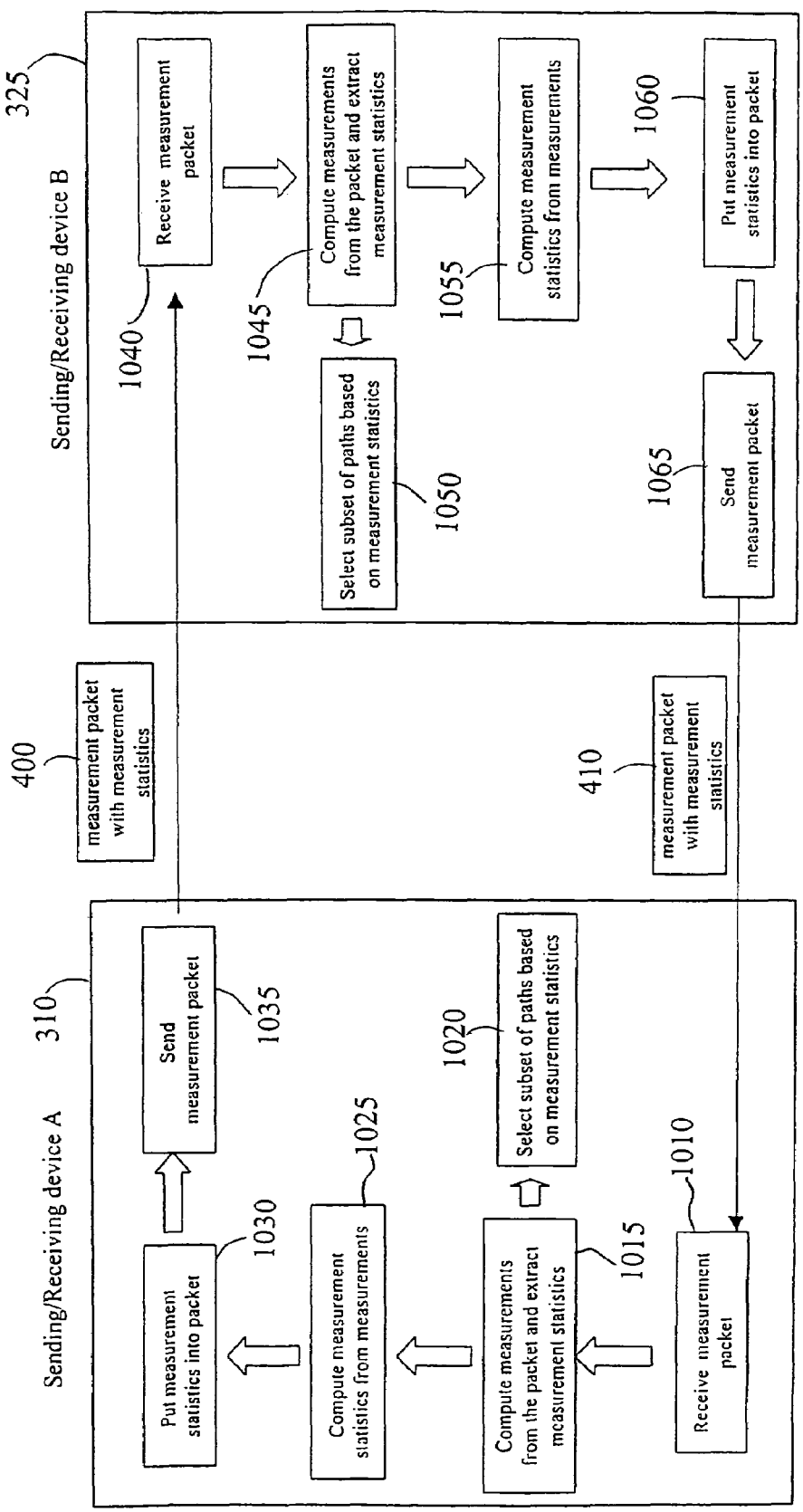
FIG. 2 shows one specific detailed embodiment of two devices, where each device is sending and receiving measurement packets as well as selecting a subset of paths.
Figure 3:
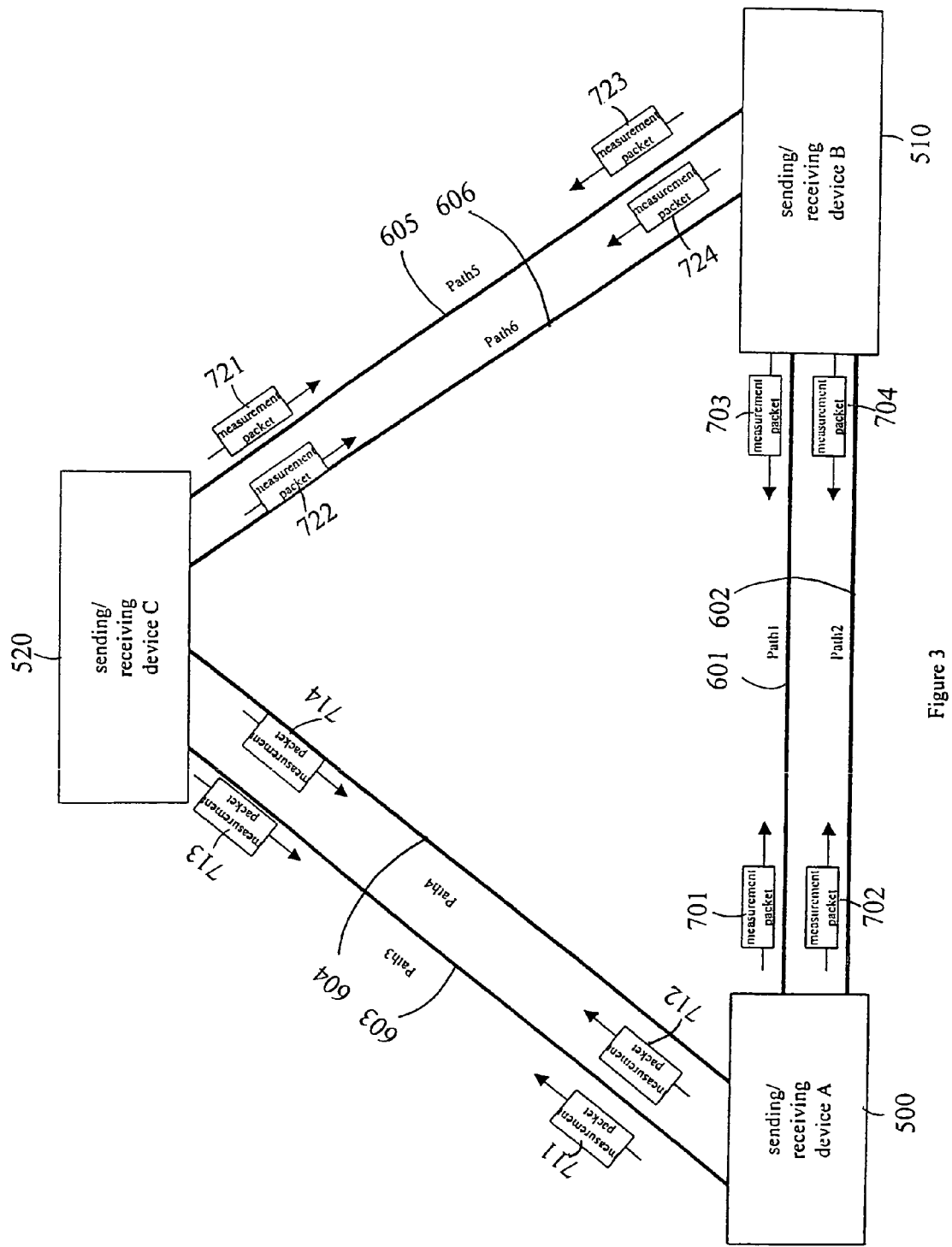
FIG. 3 shows an embodiment with more than two devices that are sending and receiving measurement packets to obtain measurements of performance characteristics of paths and to communicate measurements statistics about those paths.

FIGS. 1-3 show devices in accordance with the present invention. FIG. 1 shows 9 examples of devices sending and receiving measurement packets in accordance with the present invention. Example 1 illustrates a sending device 101 and a device 110, with the sending device 101 sending a measurement packet 200. Example 2 illustrates the device 110 and a receiving device 120, with the receiving device receiving a measurement packet 201. Example 3 illustrates the sending device 101 sending a measurement packet 203 and the receiving device 120 receiving the measurement packet 203. Example 4 illustrates the sending device 101 sending to the receiving device 120 one measurement packet 207 over a first path and another measurement packet 211 over a second path. Example 5 illustrates a sending/receiving device 125 and the device 110, with the sending/receiving device 125 receiving a measurement packet 213 and sending a measurement packet 215.

Example 6 illustrates the sending/receiving device 125 receiving a measurement packet 217 and sending a measurement packet 219 and the receiving device 120 receiving the measurement packet 219. Example 7 illustrates the sending/receiving device 125 receiving a measurement packet 223 and sending a measurement packet 224 along a first path to the receiving device 120 and sending a measurement packets 229 along a second path to the receiving device 120. Example 8 illustrates the sending device 101 sending to the sending/receiving device 125 a measurement packet 231 along a first path and a measurement packet 235 along a second path. Example 8 also illustrates the sending/receiving device 125 sending a measurement packet 237. Example 9 illustrates the sending/receiving device 125 receiving a measurement packet 239 and sending a measurement packet 241 along a first path and a measurement packet 243 along a second path. Example 9 also illustrates a sending/receiving device 126 receiving the measurement packets 241 and 243 and sending a measurement packet 245.

FIG. 2 is a block diagram of a sending/receiving device A 310 communicating with a sending/receiving device B 325. The sending/receiving device A 310 sends a measurement packet 400 with measurement statistics to the sending/receiving device B 325 and receives a measurement packet 410 with measurement statistics 410 from the sending/receiving device B 325.

FIG. 2 also illustrates steps 1010, 1015, 1020, 1025, 1030, 1035 performed by the sending/receiving device A 310 and steps 1040, 1045, 1050, 1055, 1060, and 1065 performed by the sending/receiving device B 325. When the sending/receiving device B 325 transmits the measurement packet 410, the sending/receiving device A 310 receives the packet 410 in the step 1010 and, in the step 1015, computes measurements from the packet 410 and extracts measurement statistics. From the step 1015, the sending/receiving device A 310 selects a subset of paths based on the measurement statistics in the step 1020 and also computes measurement statistics from the measurements in the step 1025. The sending/receiving device A 310 puts the measurement statistics into a packet in the step 1030. In the step 1035, the sending/receiving device A 310 sends the measurement packet 400 with measurement statistics to the sending/receiving device B 325.

FIG. 2 illustrates that the sending/receiving device B 325 performs steps 1040, 1045, 1050, 1055, 1060, and 1065, similar to the steps 1010, 1015, 1020, 1025, 1030, and 1035, respectively. Accordingly, the steps 1040, 1045, 1050, 1055, 1060, and 1065 will not be discussed here.

FIG. 3 illustrates multiple sending/receiving devices A-C, labeled 500, 510, and 520, respectively. As shown in FIG. 3, the sending/receiving device A 500 sends to the sending/receiving device B 510 a measurement packet 701 along Path 1 601 and a measurement packet 702 along Path 2 602. The sending/receiving device A 500 sends to the sending/receiving device C 520 a measurement packet 711 along Path 3 603 and a measurement packet 712 along Path 4 604.

As also illustrated in FIG. 3, the sending/receiving device B 510 sends to the sending/receiving device A 500 a measurement packet 703 along Path 1 601 and a measurement packet 704 along Path 2 602. The sending/receiving device B 510 sends to the sending/receiving device C 520 a measurement packet 723 alone Path 5 605 and a measurement packet 724 along Path 6 606. The sending/receiving device C 520 sends to the sending/receiving device A 500 a measurement packet 713 along Path3 603 and a measurement packet 714 along Path 4 604. The sending/receiving device C 520 sends to the sending/receiving device B 510 a measurement packet 721 along Path 5 605 and a measurement packet 722 along Path 6 606.

In some embodiments of the invention, loss statistics can be used as a discriminator instead of a scaling factor. That is, p-hat can eliminate paths experimenting loss. Then, the remaining paths can be selected using MS=ML.

In some embodiments of the invention, the selection of a subset of paths is based on applying at least one or more thresholds to at least one of more of the statistics.

In some embodiments of the invention, a single threshold is used, and computed as a certain percentage of the highest score of the paths. In some embodiments of the invention, the threshold is determined by subtracting a fixed quantity to the highest score of the paths.

In some embodiments of the invention, the number of paths in the subset of paths is fixed. In some embodiments of the invention, this fixed number of paths N out of M paths is determined such that the probability of having loss in (M−N) paths simultaneously is less than a certain threshold. In some embodiments of the invention, this probability is a binomial, with the assumption that all paths have the same probability of loss.

In some embodiments of the invention, the selection of the subset of the plurality of paths is based at least partly on a probability associated with each path. In some embodiments of the invention, the probability of each path is at least partly based on one or more of the measurement statistics included as data in the measurement packet.

In some embodiments of the invention, the probabilities of each path are equal.

In some embodiments of the invention, the selection of the subset of the plurality of paths is based at least partly on the cost of the path.

In some embodiments of the invention, the selection of the subset of the plurality of paths is based at least partly on the amount of bandwidth consumed over a period of time.

Other possibilities to compute path probabilities will be apparent to those skilled in the art.

Other mechanisms to select a subset of the paths will be apparent to those skilled in the art.

What is claimed is:

1. A method for communicating data within measurement traffic, the method comprising:
    sending a plurality of one or more measurement packets over a plurality of one or more paths, each of the first plurality of one or more measurement packets having a common source and destination IP address, each of the plurality of one or more paths traversing at least a portion of an internetwork, and each of the plurality of one or more measurement packets including:
    information for a receiver of the measurement packet to compute measurements of performance characteristics of at least a portion of the path of the measurement packet,
and data including control data comprising instructions that direct a receiver of the measurement packet to change one or more configuration parameters of the receiver, the data further including one or more of measurement statistics, a generic communication channel, and network information; and
    determining a delay average for the plurality of one or more measurement packets by analyzing at least two packets from the plurality of one or more measurement packets;
    determining a jitter average for the plurality of one or more measurement packets by analyzing at least two packets from the plurality of one or more measurement packets; and
    combining the jitter average and delay average for the plurality of one or more measurement packets into a single value; and
    including the single value in the data measurement statistics.

2. The method of claim 1, wherein the measurements of performance characteristics include one-way measurements.

3. The method of claim 1, wherein the data includes measurement statistics that include at least one of averages, deviations, and variances determined by analyzing at least two of the plurality of one or more measurement packets.

4. The method of claim 1, farther comprising:
    determining a delay average for the plurality of one or more measurement packets by analyzing at least two packets from the plurality of one or more measurement packets;
    determining a jitter average for the plurality of one or more measurement packets by analyzing at least two packets from the plurality of one or more measurement packets; and
    combining the jitter average and delay average for the plurality of one or more measurement packets into a single value; and
    including the single value in the data measurement statistics.

5. The method of claim 1, wherein the data comprises network information retrieved from network routers, wherein the network information comprises one or more of in-bound link utilization, out-bound link utilization, in-bound link bandwidth, out-bound link bandwidth, and CPU utilization.

6. A method for communicating data within measurement traffic, the method comprising:
    receiving a plurality of one or more measurement packets over a plurality of one or more paths, each of the plurality of one or more measurement packets being assigned a sequence number from a range of sequence numbers, each of the plurality of one or more paths traversing at least a portion of an internetwork, and each of the plurality of one or more measurement packets including:
    information for a receiver of the measurement packet to compute measurements of performance characteristics of at least a portion of the path of the measurement packet, the information including the assigned sequence number,
    data including control data directing a receiver of the measurement packet to change one or more configuration parameters of the receiver, the data further including one or more of measurement statistics, a generic communication channel, network information; and
    determining a delay average for the plurality of one or more measurement packets by analyzing at least two packets from the plurality of one or more measurement packets;
    determining a jitter average for the plurality of one or more measurement packets by analyzing at least two packets from the plurality of one or more measurement packets; and
    combining the jitter average and delay average for the plurality of one or more measurement packets into a single value; and
    including the single value in the data measurement statistics.

7. The method of claim 6, wherein the measurements of performance characteristics include one-way measurements.

8. The method of claim 6, wherein the data includes measurement statistics calculated for a given path between a sender and the receiver.

9. The method of claim 6, further comprising analyzing of the measurement packet based on a dynamic algorithm, the dynamic algorithm computing computed statistics on one or more of the measurements of performance characteristics of at least a portion of the path of the measurement packet.

10. The method of claim 9, wherein a subset of the plurality of one or more paths is selected based at least in part on at least one of: one or more of the measurement statistics from the measurement packet and one or more of the computed statistics.

11. A method for communicating data within measurement traffic, the method comprising:
    sending a first plurality of one or more measurement packets over a first plurality of one or more paths, each of the first plurality of one or more measurement packets having a common source and destination IP address, each of the first plurality of one or more paths traversing at least a portion of an internetwork, and each of the first plurality of one or more measurement packets including:
    information for a receiver of the measurement packet to compute measurements of performance characteristics of at least a portion of the path of the measurement packet, the performance characteristics including at least one of averages, deviations, and variances determined by analyzing at least two of the first plurality of one or more measurement packets,
    data including control data directing a receiver of the measurement packet to change one or more configuration parameters of the receiver, the data further including one or more of measurement statistics, a generic communication channel, network information, and
    determining a delay average for the first plurality of one or more measurement packets by analyzing at least two packets from the first plurality of one or more measurement packets;

determining a utter average for the first plurality of one or more measurement packets by analyzing at least two packets from the first plurality of one or more measurement packets; and combining the utter average and delay average for the first plurality of one or more measurement packets into a single value; and including the single value in the data measurement statistics, receiving a second plurality of one or more measurement packets over a second plurality of one or more paths, each of the second plurality of one or more paths traversing at least a portion of an internetwork, and each of the second plurality of one or more measurement packets including:

information for a receiver of the measurement packet to compute measurements of performance characteristics of at least a portion of the path of the measurement packet, and data including control data directing a receiver of the measurement packet to change one or more configuration parameters of the receiver, the data further including one or more of measurement statistics, a generic communication channel, network information, and determining a delay average for the second plurality of one or more measurement packets by analyzing at least two packets from the second plurality of one or more measurement packets;

determining a jitter average for the second plurality of one or more measurement packets by analyzing at least two packets from the second plurality of one or more measurement packets; and combining the jitter average and delay average for the second plurality of one or more measurement packets into a single value; and including the single value in the data measurement statistics.

12. The method of claim 11, wherein the measurements of performance characteristics include one-way measurements.

13. The method of claim 11, wherein the data includes measurement statistics.

14. The method of claim 13, wherein the measurement statistics are at least partly responsive to jitter.

15. The method of claim 13, wherein the measurement statistics are at least partly responsive to path delay.

16. The method of claim 13, wherein the measurement statistics are at least partly responsive to loss deduced by identifying missing sequence numbers.

17. The method of claim 11, wherein the data includes a generic communication channel.

18. The method of claim 11, wherein the data includes network information.

19. The method of claim 11, wherein the data is embedded in multiple measurement packets that are sent over multiple paths for improved communication performance, including redundancy and shorter transmission time.

20. The method of claim 11, wherein the measurement packets are at least one of encrypted and digitally signed.

21. The method of claim 11, wherein a clock referred to by a sender of the measurement packet and a clock referred to by the receiver of the measurement packet are synchronized the synchronization methods including at least one or more of GPS, NTP, IRIG, and NIST.

22. The method of claim 11, further comprising analyzing of the measurement packet based on a dynamic algorithm, the dynamic algorithm computing computed statistics on one or more of the measurements of performance characteristics of at least a portion of the path of the measurement packet.

23. The method of claim 22, wherein the algorithm computes averages of the measurements, including at least one of a moving average, an average based on the Robbins-Moro estimator, a window-based average, and a bucket-based average.

24. The method of claim 22, wherein the algorithm is at least partly specified through an external API.

25. The method of claim 22, wherein the computed statistics are at least partly recomputed upon the arrival of every measurement packet.

26. The method of claim 22, wherein the computed statistics are based at least partly on measurement statistics from the measurement packet.

27. The method of claim 22, wherein a subset of the plurality of one or more paths is selected based at least in part on at least one of: one or more of the measurement statistics from the measurement packet and one or more of the computed statistics.

28. The method of 27, wherein the selection of the subset of the plurality of one or more paths is based at least partly on the position of paths in a ranking.

29. The method of 28, wherein the ranking is at least partly based on one or more of the measurement statistics included as data in the measurement packet.

30. The method of 27, wherein the selection of the subset of the plurality of one or more paths is based at least partly on a probability associated with each path of the plurality of one or more paths.

31. The method of claim 30, wherein the probability of each path of the plurality of one or more paths is at least partly based on one or more of the measurement statistics included as data in the measurement packet.

32. The method of 27, wherein the selection of the subset of the plurality of one of more paths is based at least partly on applying one or more thresholds to at least one of the measurement statistics included as data in the measurement packet.

33. The method of claim 11, wherein measurement packets at least partly rely on UDP.

34. The method of claim 11, wherein at least one of the plurality of one or more paths is at least partly implemented with at least one of a GRE tunnel and an IPSEC tunnel.

35. The method of claim 11, wherein at least one of the plurality of one or more paths is at least partly implemented with at least one of a frame relay PVC, an ATM PVC, and MPLS.

36. The method of claim 11, wherein the internetwork is a plurality of one or more subnetworks, including at least one of a plurality of one or more VPNs; an overlay network; a plurality of one or more BGP autonomous systems; a plurality of one or more local area networks; a plurality of one or more metropolitan area networks; and a plurality of one or more wide area networks.

37. The method of claim 11, wherein the measurement packet sizes and times between measurement packets simulate the traffic pattern of a plurality of one or more applications.

38. The method of claim 37, wherein the plurality of one or more applications includes voice applications.

39. The method of claim 37, wherein the plurality of one or more applications includes video applications.

40. The method of claim 11, wherein the sending and receiving are performed on a single device configured to change the one or more configuration parameters in response to receiving control data.

41. The method of claim 11, wherein the measurement statistics are at least partly responsive to jitter, delay, and loss.

42. A networking system, comprising:
- a plurality of one or more devices communicating at least a first plurality of one or more measurement packets over a first plurality of one or more paths, each of the plurality of one or more measurement packets being assigned a sequence number from a range of sequence numbers, each of the first plurality of one or more paths traversing at least a portion of an internetwork, and each of the first plurality of one or more measurement packets including:
- information for a receiver of the measurement packet to compute measurements of performance characteristics of at least a portion of the path of the measurement packet, the performance characteristics including at least one of averages, deviations, and variances determined by analyzing at least two of the plurality of one or more measurement packets, and
- data including control data directing a receiver of the measurement packet to change one or more configuration parameters of the receiver, the data further including one or more of measurement statistics, a generic communication channel, network information; and
- determining a delay average for the first plurality of one or more measurement packets by analyzing at least two packets from the first plurality of one or more measurement packets;
- determining a jitter average for the first plurality of one or more measurement packets by analyzing at least two packets from the first plurality of one or more measurement packets; and
- combining the jitter average and delay average for the first plurality of one or more measurement packets into a single value; and
- including the single value in the data measurement statistics.

43. The networking system of claim 42, wherein the plurality of one or more devices includes a first sub-plurality of one or more devices, wherein the first sub-plurality of one or more devices sends one or more of the first plurality of one or more measurement packets.

44. The networking system of claim 43, wherein the plurality of one or more devices includes a second sub-plurality of one or more devices, wherein the second sub-plurality of one or more devices receives one or more of a second plurality of one or more measurement packets over a second plurality of one or more paths, each of the second plurality of one or more paths traversing at least a portion of the internetwork, each of the second plurality of one or more measurement packets including:
- information for a receiver of the measurement packet to compute measurements of performance characteristics of at least a portion of the path of the measurement packet, and
- data including one or more of measurement statistics, a generic communication channel, network information, and control data directing a receiver of the measurement packet to change one or more configuration parameters of the receiver.

45. The networking system of claim 44, wherein at least one of the first plurality of one or more measurement packets and at least one of the second plurality of one or more measurement packets are the same packet.

46. The networking system of claim 42, wherein at least one of the plurality of one or more devices receives one or more of the first plurality of one or more measurement packets.

47. The networking system of claim 42, wherein the plurality of one or more devices includes a first sub-plurality of one or more devices, wherein the first sub-plurality of one or more devices receives one or more of a second plurality of one or more measurement packets over a second plurality of one or more paths and sends one or more of the first plurality of one or more measurement packets, each of the second plurality of one or more paths traversing at least a portion of the internetwork, each of the second plurality of one or more measurement packets including:
- information for a receiver of the measurement packet to compute measurements of performance characteristics of at least a portion of the path of the measurement packet, and
- data including one or more of measurement statistics, a generic communication channel, network information, and control data directing a receiver of the measurement packet to change one or more configuration parameters of the receiver.

48. The networking system of claim 47, wherein at least one of the first plurality of one or more measurement packets and at least one of the second plurality of one or more measurement packets are the same packet.

49. The networking system of claim 47, wherein the plurality of one or more devices includes a second sub-plurality of one or more devices, wherein the second sub-plurality of one or more devices sends one or more of the first plurality of one or more measurement packets.

50. The networking system of claim 49, wherein at least one of the first plurality of one or more measurement packets and at least one of the second plurality of one or more measurement packets are the same packet.

51. The networking system of claim 47, wherein the plurality of one or more devices includes a second sub-plurality of one or more devices, wherein the second sub-plurality of one or more devices receives one or more of the second plurality of one or more measurement packets.

52. The networking system of claim 51, wherein at least one of the first plurality of one or more measurement packets and at least one of the second plurality of one or more measurement packets are the same packet.

* * * * *